US012753797B2

(12) United States Patent
Kim

(10) Patent No.: US 12,753,797 B2
(45) Date of Patent: Oct. 6, 2026

(54) THRUST FOIL AIR BEARING HAVING DOWNWARDLY MOVABLE TOP FOIL LEADING EDGE

(71) Applicant: TNE KOREA CO., LTD., Cheongju-si (KR)

(72) Inventor: Kyeong Su Kim, Daejeon (KR)

( * ) Notice: Subject to any disclaimer, the term of this patent is extended or adjusted under 35 U.S.C. 154(b) by 151 days.

(21) Appl. No.: 18/845,097

(22) PCT Filed: Feb. 1, 2023

(86) PCT No.: PCT/KR2023/001438

§ 371 (c)(1),
(2) Date: Sep. 9, 2024

(87) PCT Pub. No.: WO2023/191289

PCT Pub. Date: Oct. 5, 2023

(65) Prior Publication Data

US 2026/0168530 A1 Jun. 18, 2026

(30) Foreign Application Priority Data

Mar. 28, 2022 (KR) ........................ 10-2022-0038124

(51) Int. Cl.
*F16C 17/04* (2006.01)

(52) U.S. Cl.
CPC .................................. *F16C 17/042* (2013.01)

(58) Field of Classification Search
CPC ..................................................... F16C 17/042
See application file for complete search history.

(56) References Cited

U.S. PATENT DOCUMENTS

| | | | | |
|---|---|---|---|---|
| 5,498,082 | A | 3/1996 | Nadjafi | |
| 9,726,220 | B2 * | 8/2017 | Kim | F16C 17/042 |
| 11,852,191 | B2 * | 12/2023 | Choi | F16C 43/02 |
| 2021/0190140 | A1 * | 6/2021 | Omori | F16C 27/08 |

FOREIGN PATENT DOCUMENTS

| | | | | |
|---|---|---|---|---|
| CN | 115492844 | A * | 12/2022 | F16C 17/08 |
| KR | 10-1396889 | B1 | 5/2014 | |
| KR | 10-1558489 | B1 | 10/2015 | |
| KR | 10-2289217 | B1 | 8/2021 | |
| KR | 10-2021-0146158 | A | 12/2021 | |

* cited by examiner

*Primary Examiner* — James Pilkington
(74) *Attorney, Agent, or Firm* — KORUS Patent, LLC; Seong Il Jeong

(57) ABSTRACT

A thrust foil air bearing for an apparatus having a stationary part and a rotating part that rotates about a centerline. The bearing has a lower plate fixed to the stationary part, a middle plate on the lower plate and carrying an elastically deformable bump foil, and an upper plate on the middle plate facing the rotating part and carrying a top foil that rests on the bump foil. The top foil includes a leading edge disposed upstream with respect to a flow of air and configured to move downward toward the lower plate by air pressure generated by rotation of the rotating part, thereby increasing air pressure generated on an upper surface of the top foil and enabling the thrust foil air bearing to support a higher load.

9 Claims, 13 Drawing Sheets

Prior Art

Prior Art

THRUST FOIL AIR BEARING HAVING DOWNWARDLY MOVABLE TOP FOIL LEADING EDGE

CROSS-REFERENCE TO RELATED APPLICATIONS

This application is a national stage entry under 35 U.S.C. § 371 of International Application No. PCT/KR2023/001438, filed Feb. 1, 2023, which claims priority to and the benefit of Korean Patent Application No. 10-2022-0038124, filed Mar. 28, 2022, in the Korean Intellectual Property Office, the disclosures of which are incorporated herein by reference in their entireties.

TECHNICAL FIELD

The present invention relates to a thrust foil air bearing, and more particularly, to a thrust foil air bearing capable of carrying a higher load by increasing an air pressure generated on an upper surface of a top foil.

BACKGROUND ART

Air bearings are bearings for supporting a load by floating a rotating shaft with the pressure of air compressed between the rotating shaft and the bearing.

The air bearings use a principle that, when a viscous gas such as air is compressed by meeting a stationary surface while moving along with a moving surface, the air trapped between the moving surface and the stationary surface increases in pressure to lift the moving surface.

The air bearings include thrust air bearings for supporting a load applied along a longitudinal direction of the rotating shaft, and journal air bearings for supporting a load applied along a radial direction of the rotating shaft.

Examples of the thrust air bearings include thrust foil air bearings which use a thin foil to form a pressure more easily and increase dynamic stability at high speed.

FIG. 14 shows an example of an existing thrust foil air bearing 1, and the thrust foil air bearing 1 includes a lower plate 2 which is a plate-shaped member coupled to a stationary part S, a bump foil 3 disposed on an upper surface of the lower plate 2 and being elastically deformable, and a top foil 4 disposed on the bump foil 3 to contact a rotating part R. Herein, the rotating part R is coupled to a rotating shaft F which rotates about a centerline C in a preset rotation direction W.

In the existing thrust foil air bearing 1, the bump foil 3 and the top foil 4 are welded to the upper surface of the lower plate 2. When the bump foil 3 and the top foil 4 are coupled to the lower plate 2 through welding, although an overall bearing structure may be simplified and initial product development costs and mold production costs may be reduced, a plurality of production processes such as pressing and welding need to be performed and efforts are required to produce welding jigs, control welding quality, etc. Consequently, disadvantages are caused in terms of product price control and quality control and thus suitability for mass production is not achieved.

To solve the problems of the welded thrust foil air bearing 1, a thrust foil air bearing in which a plurality of plates such as a lower plate, a middle plate, and an upper plate are stacked on one another, slots or holes are formed near the outer edge of the bearing, and then the plates are fixed using pins has been developed.

However, despite advantages in terms of production costs and quality control, the pin-fixed thrust foil air bearing requires relatively high development costs. Furthermore, because the lower, middle, and upper plates formed with molds are not completely flat, when those plates are stacked on one another, a gap is created therebetween and an overall bearing thickness is increased.

Furthermore, according to the pin-fixed thrust foil air bearing, when the plurality of plates are fixed with a few pins coupled near the outer circumference of the bearing, although the outer circumference of the bearing may be relatively firmly fixed to bring the plates into close contact with each other, the inner circumference of the bearing is not fixed but is bulged and thus the force contacting the rotating part R is increased. As such, according to the pin-fixed thrust foil air bearing, starting torque may increase when a machine starts, abrasion of the bearing may be severe, and the management and assembly of the bearing may not be easy because of a stack structure of a plurality of plates.

To solve the above-described problems, a thrust foil air bearing 1*a* illustrated in FIG. 15 has been designed. The thrust foil air bearing 1*a* has an assembly structure in which "]"-shaped couplers 12*a* protruding from a lower plate couple the lower plate, a middle plate, and an upper plate 30 together.

However, according to the existing thrust foil air bearing 1*a*, friction may be caused between the couplers 12*a* and the rotating part R when a load is received, and the couplers 12*a* positioned between adjacent top foils 34*a* may disturb the flow of air between the top foils 34*a*.

DETAILED DESCRIPTION OF THE INVENTION

Technical Problem

The present invention provides a thrust foil air bearing with a structure improved to carry a higher load by increasing an air pressure generated on an upper surface of a top foil.

Technical Solution

According to an aspect of the present invention, there is provided a thrust foil air bearing usable in apparatuses including a stationary part, and a rotating part which rotates relative to the stationary part about a centerline, the thrust foil air bearing including a lower plate coupled to the stationary part so as not to move relatively; a middle plate disposed on an upper surface of the lower plate and including a bump foil capable of elastic deformation; and an upper plate disposed on an upper surface of the middle plate to face the rotating part and including a top foil disposed on the bump foil to contact the rotating part, wherein the top foil includes a leading edge disposed upstream on a basis of flow of air and provided to move downwards toward the lower plate by an air pressure generated by the rotation of the rotating part.

The top foil may include a top foil body; and a first wing protruding upstream from the top foil body and having a cantilever shape capable of elastic deformation in a vertical direction, and the leading edge may be provided at a front end of the first wing.

A shape of the first wing may be determined based on cooperation of an inner through hole extending along a circumferential direction of the centerline and provided at an inner side of the top foil; an outer through hole extending along the circumferential direction of the centerline and provided at an outer side of the top foil; and a middle through hole extending along a radial direction of the centerline to connect the inner and outer through holes.

The leading edge may have a shape bent downwards at a first curvature preset.

The lower plate may include a stopper for restraining the leading edge to limit downward elastic deformation of the leading edge to a preset depth.

The stopper may be disposed below the leading edge while penetrating through the middle plate, to support a lower surface of the leading edge.

The stopper may extend in a radial direction of the centerline and have a cross-section bent in a "]" shape.

The stopper may include a plurality of unit stoppers spaced apart from each other in a radial direction of the centerline.

The top foil may further include a trailing edge disposed downstream on a basis of flow of air and having a shape bent downwards at a second curvature preset.

The lower, middle, and upper plates may include bearing mount holes through which bearing mount pins penetrate.

Advantageous Effects

According to the present invention, a thrust foil air bearing usable in apparatuses including a stationary part, and a rotating part which rotates relative to the stationary part about a centerline includes a lower plate coupled to the stationary part so as not to move relatively; a middle plate disposed on an upper surface of the lower plate and including a bump foil capable of elastic deformation; and an upper plate disposed on an upper surface of the middle plate to face the rotating part and including a top foil disposed on the bump foil to contact the rotating part, and the top foil includes a leading edge disposed upstream on a basis of flow of air and provided to move downwards toward the lower plate by an air pressure generated by the rotation of the rotating part. As such, the thrust foil air bearing may carry a higher load by increasing an air pressure generated on an upper surface of the top foil when the rotating part rotates.

BEST MODE

Hereinafter, the present invention will be described in detail by explaining embodiments of the invention with reference to the attached drawings.

Figure 1:
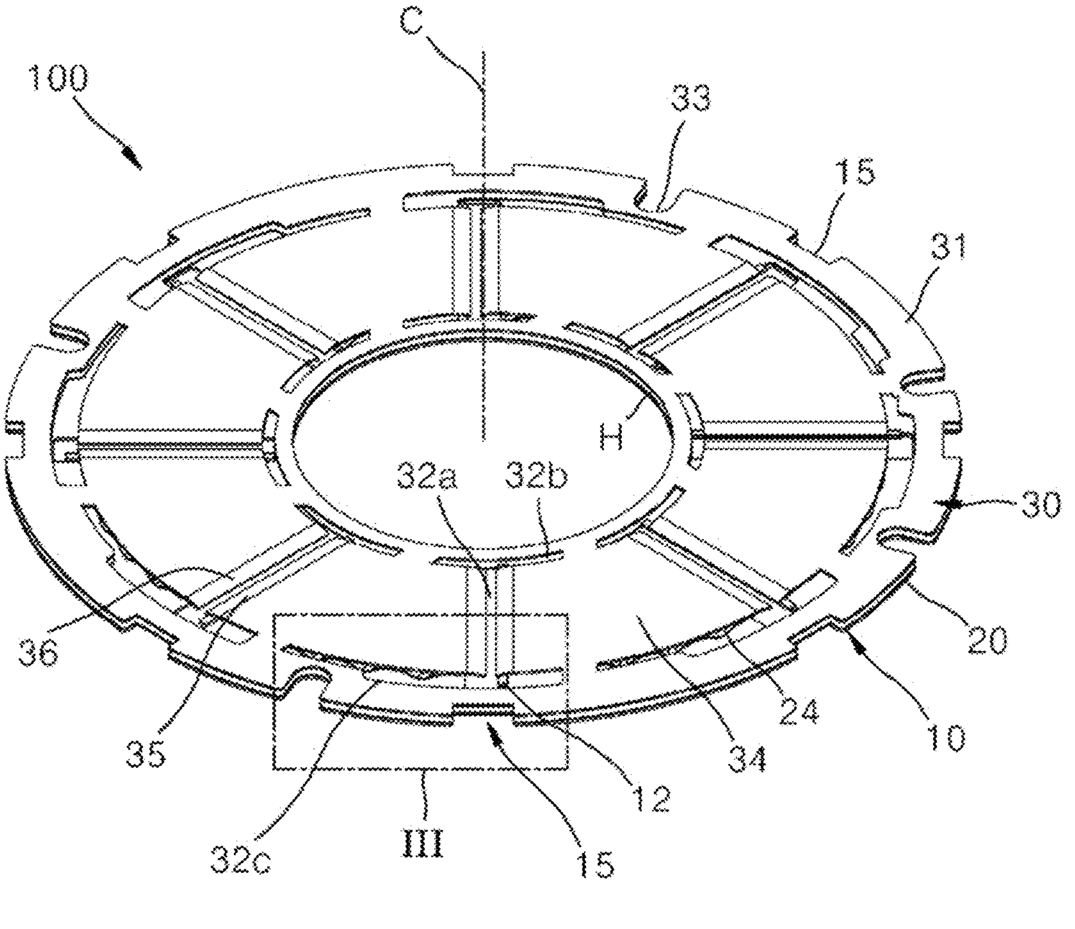
FIG. 1 is an assembled perspective view of a thrust foil air bearing according to an embodiment of the present invention.
Figure 2:
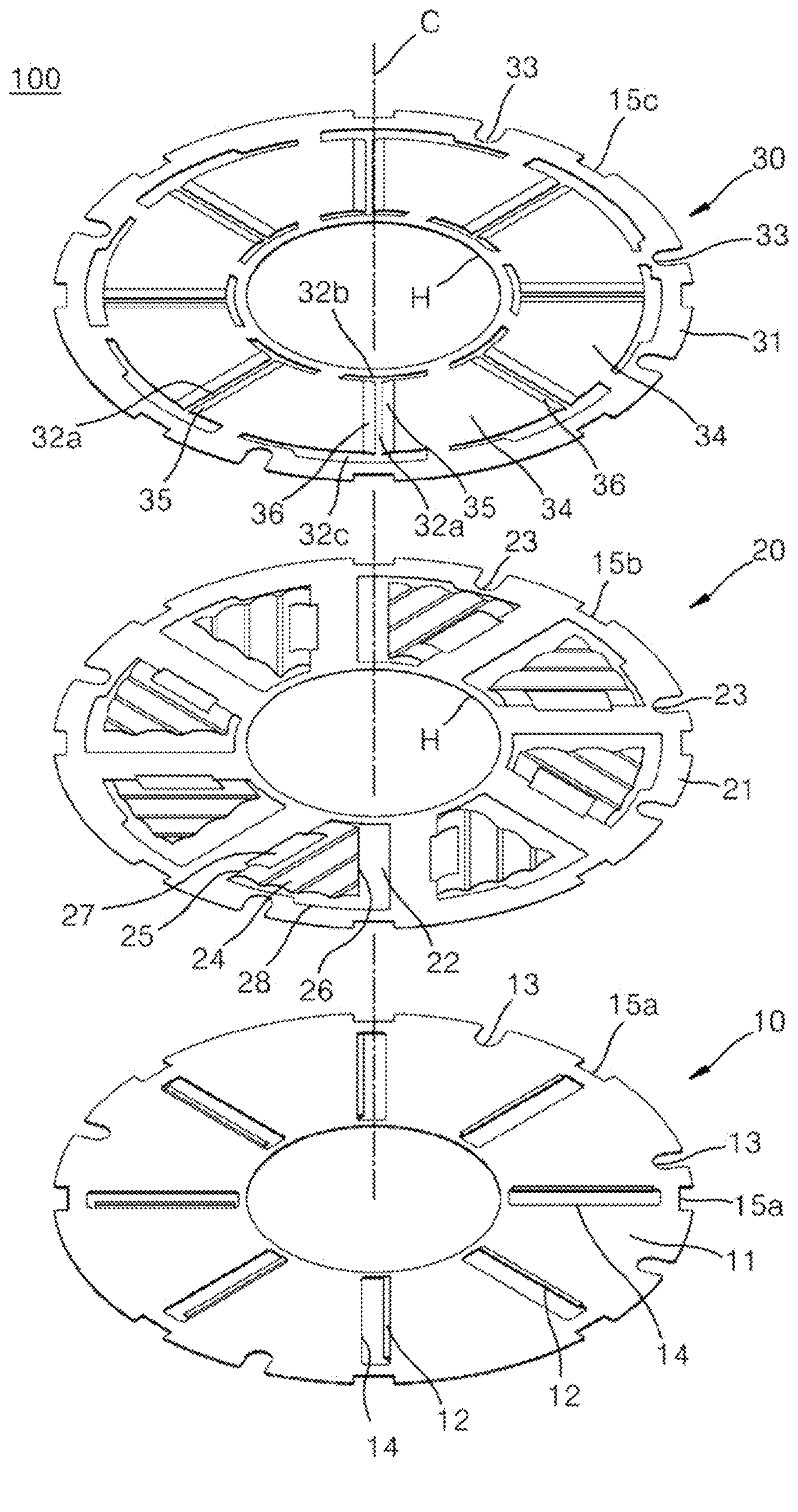
FIG. 2 is an exploded perspective view of the thrust foil air bearing illustrated in FIG. 1.
Figure 3:
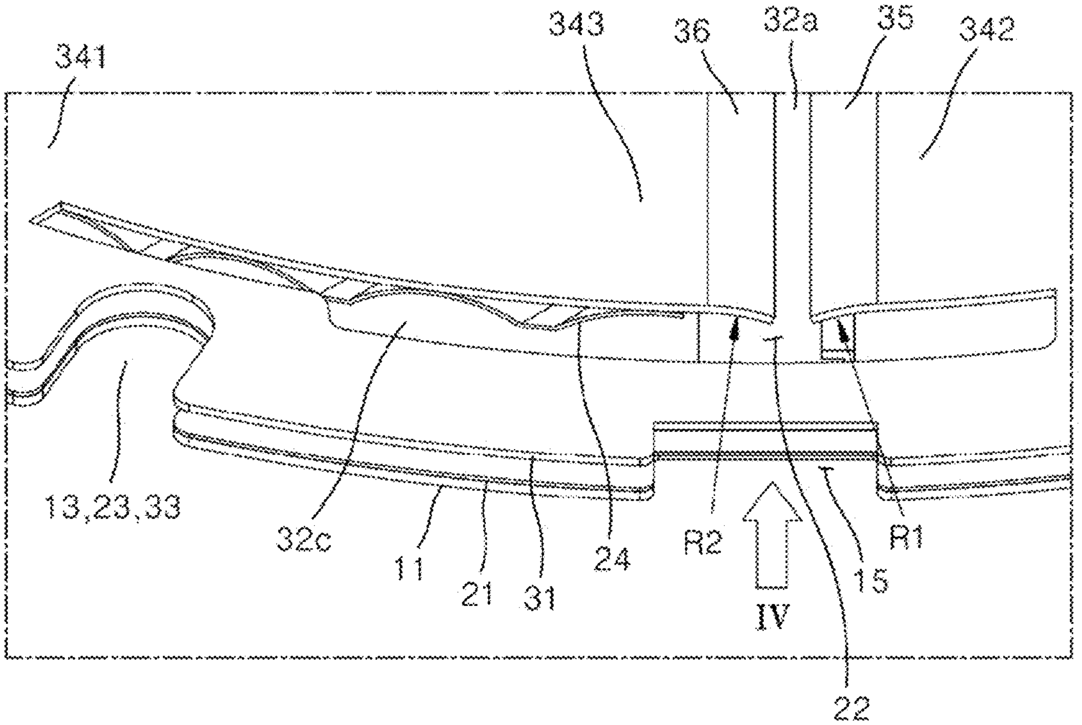
FIG. 3 is an enlarged view of portion III of the thrust foil air bearing illustrated in FIG. 1.

FIG. 1 is an assembled perspective view of a thrust foil air bearing 100 according to an embodiment of the present invention, FIG. 2 is an exploded perspective view of the thrust foil air bearing 100 illustrated in FIG. 1, and FIG. 3 is an enlarged view of portion III of the thrust foil air bearing 100 illustrated in FIG. 1.

Referring to FIGS. 1 to 3, the thrust foil air bearing 100 according to an embodiment of the present invention is an air bearing for supporting a load with the pressure of compressed air, and is also a thrust bearing usable in various apparatuses including a stationary part S, and a rotating part R which rotates relative to the stationary part S about a centerline C. The thrust foil air bearing 100 includes a lower plate 10, a middle plate 20, and an upper plate 30.

Figure 14:
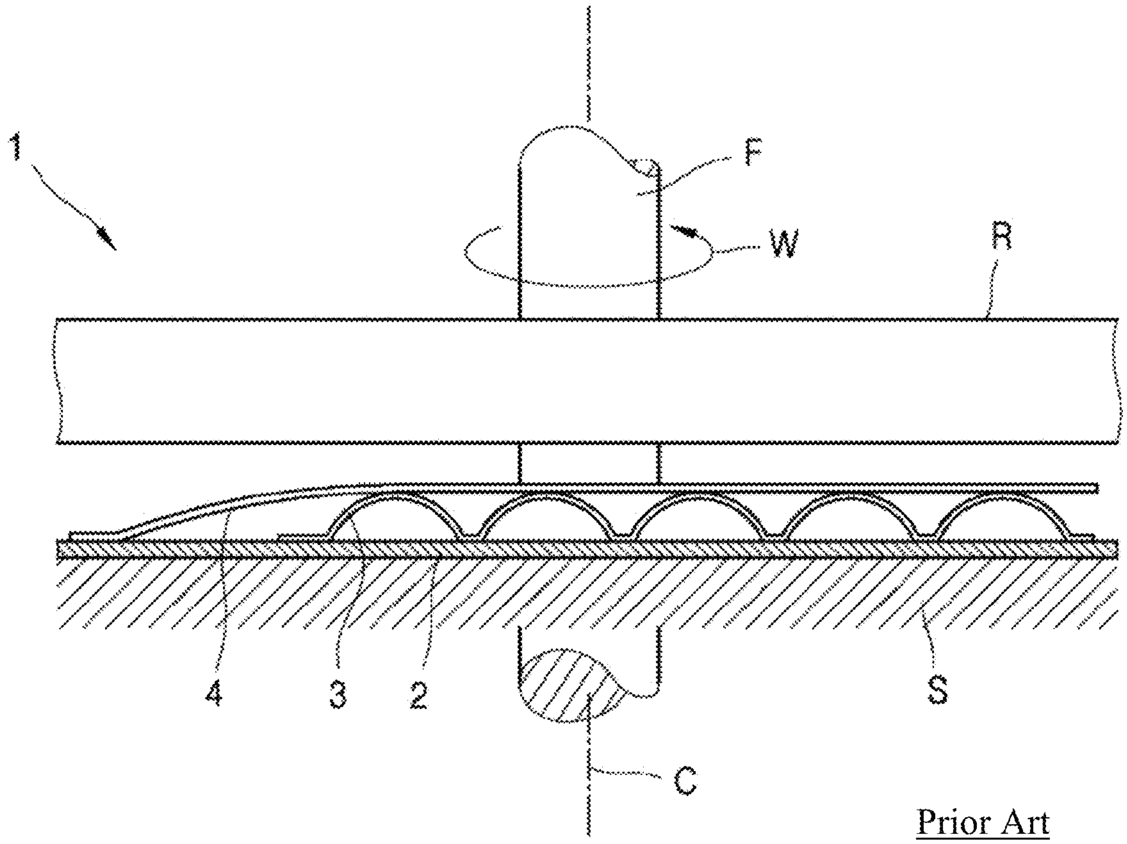
FIG. 14 is a cross-sectional view of an example of existing foil air bearing.
Figure 15:
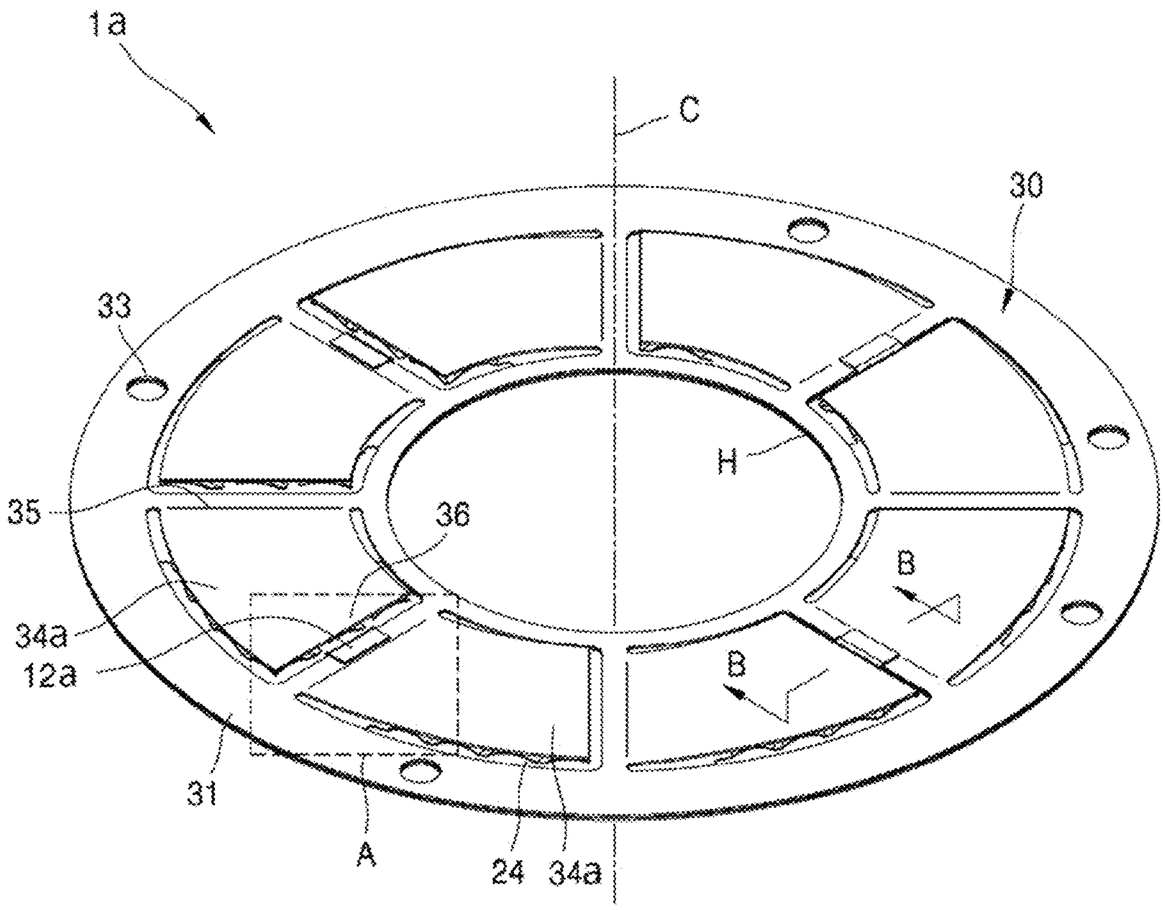
FIG. 15 is a perspective view of another example of existing foil air bearing.

Herein, the stationary and rotating parts S and R are circular disc members having the centerline C as the center of circle as shown in FIG. 14, the rotating part R is coupled to a rotating shaft F which rotates about the centerline C in a preset rotation direction W, and a plurality of bearing mount pins (not shown) which are rod members having a circular cross-section and protruding in a direction of the centerline C are arranged on an upper surface of the stationary part S.

The bearing mount pins (not shown) serve to couple the lower, middle, and upper plates 10, 20, and 30 together not to relatively rotate on a virtual plane perpendicular to the centerline C.

Meanwhile, the rotating part R is a relative term determined because it rotates relative to the stationary part S and thus the terms rotating part R and stationary part S may be used interchangeably. However, the following description is provided on the assumption that the stationary part S is a part that is stationary in the absolute coordinate system and the rotating part R is a part that rotates in the absolute coordinate system.

As shown in FIG. 2, the lower plate 10 is a circular disc member produced by pressing a metal sheet, is disposed on the upper surface of the stationary part S, and includes a lower plate body 11, stoppers 12, and bearing mount holes 13.

The lower plate body 11 is a circular disc portion having the centerline C as the center of circle, and a lower surface thereof is disposed on the upper surface of the stationary part S.

A hole H having the centerline C as the center of circle is formed at the center of the lower plate body 11.

Figure 4:
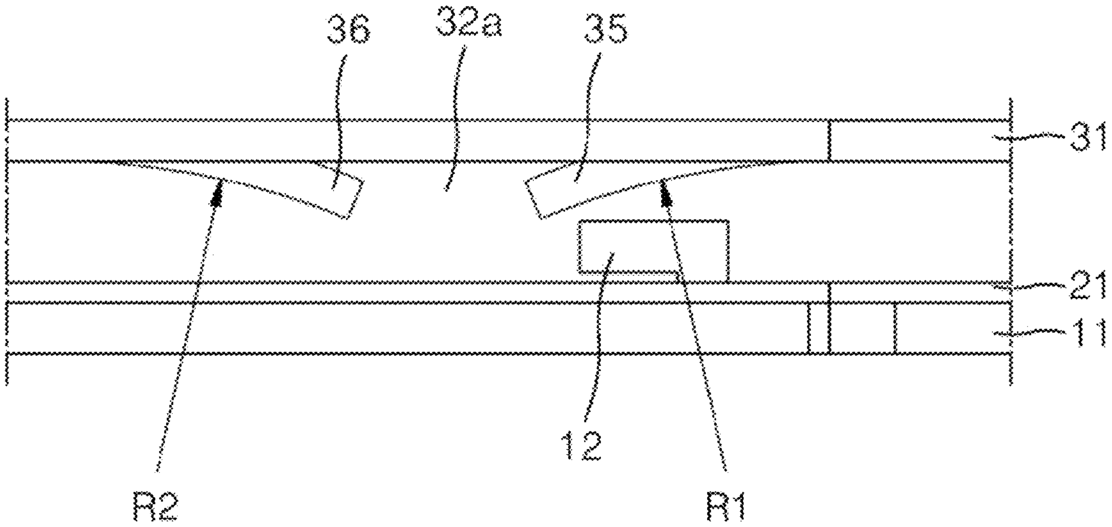
FIG. 4 is an enlarged view of the thrust foil air bearing illustrated in FIG. 3 and viewed from direction IV.
Figure 5:
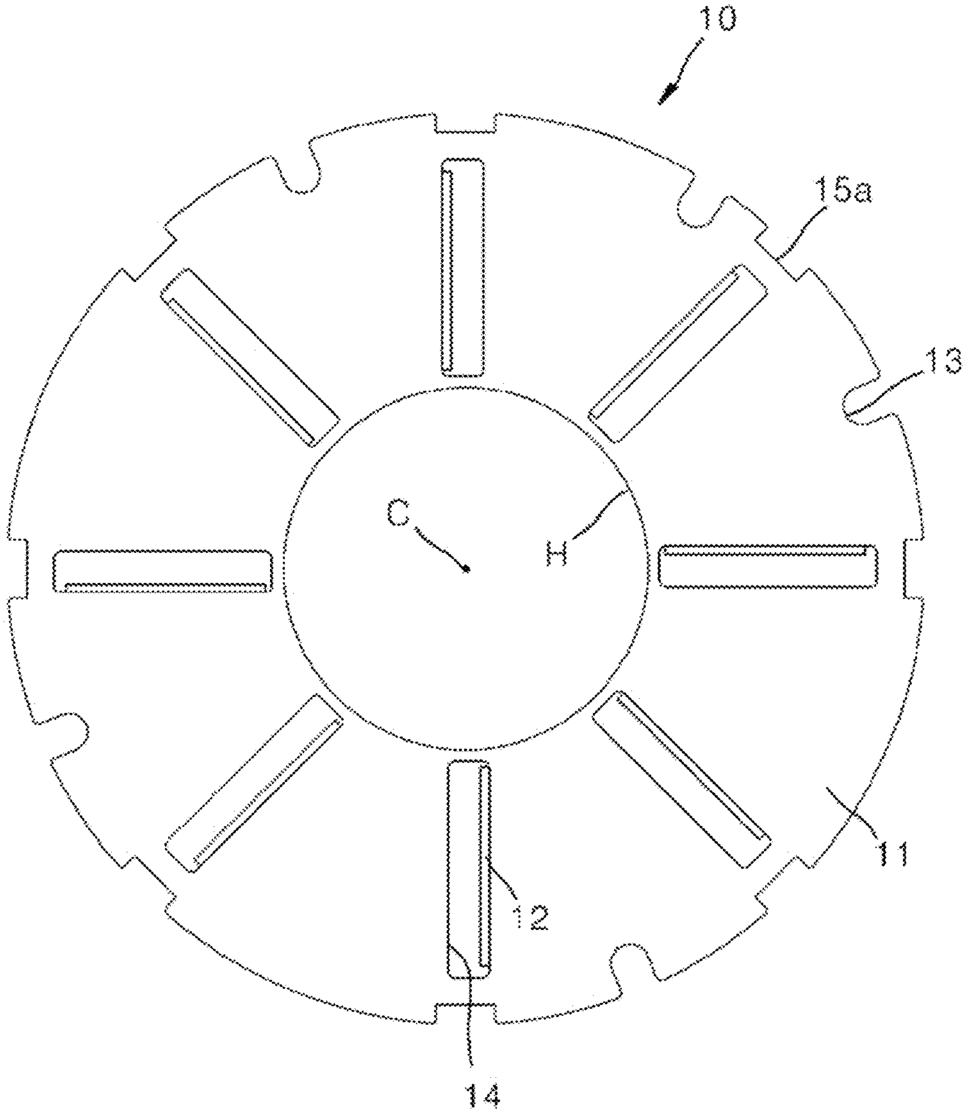
FIG. 5 is a plan view of a lower plate illustrated in FIG. 2.
Figure 6:
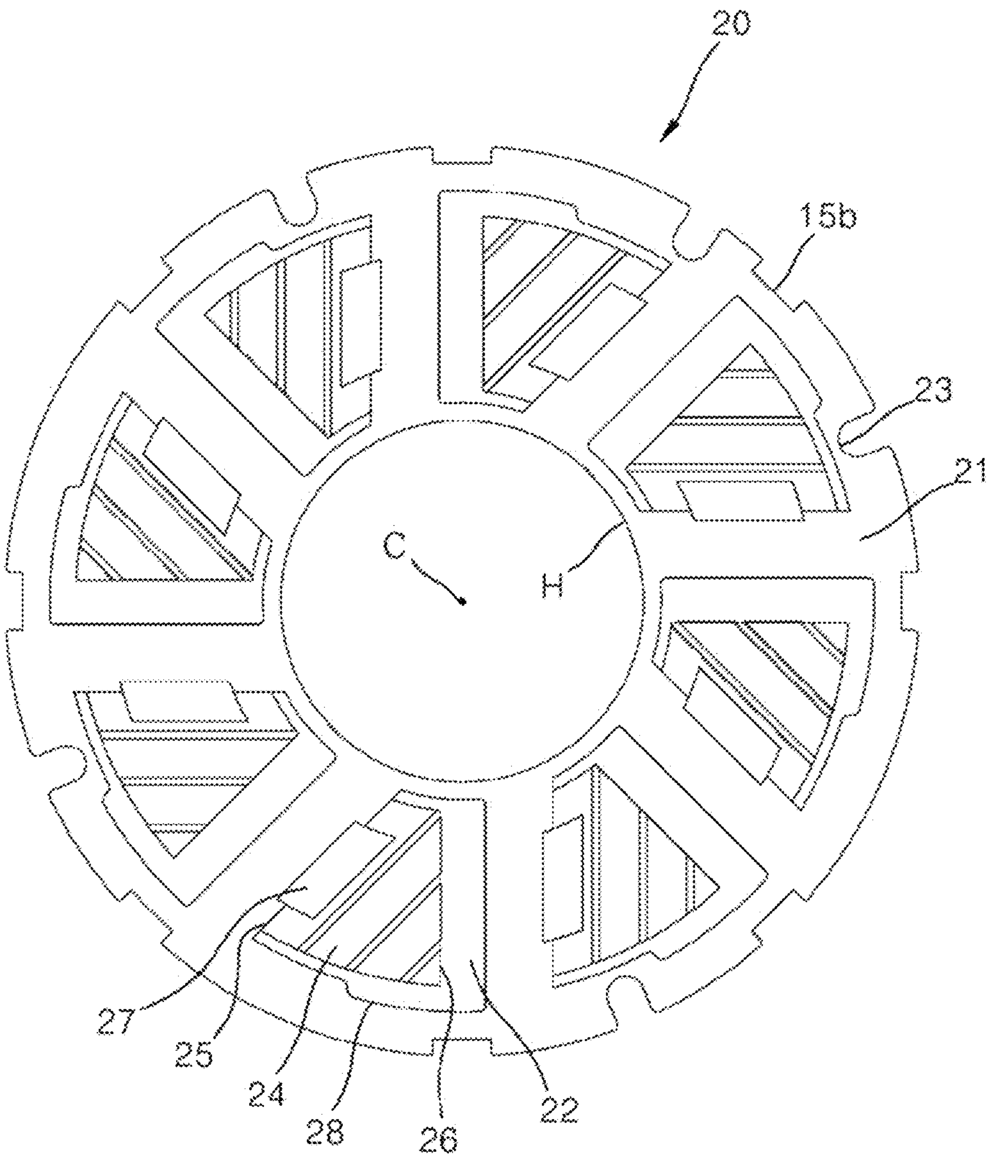
FIG. 6 is a plan view of a middle plate illustrated in FIG. 2.

Each stopper 12 is a portion for restraining a leading edge 35 to be described below to limit downward elastic deformation of the leading edge 35 to a preset depth, and has a cross-section bent in a "]" shape as shown in FIGS. 2 and 4.

The stopper 12 protrudes from the lower plate body 11 toward the middle plate 20 as shown in FIG. 4.

The stopper 12 is disposed below the leading edge 35 while penetrating through a first through hole 22 of the middle plate 20 as shown in FIG. 3, and provided to support a lower surface of the leading edge 35 in the current embodiment.

A plurality of stoppers 12 are provided and arranged at preset intervals along a circumferential direction of the centerline C as shown in FIG. 2.

The stopper 12 is disposed between an inner circumferential surface of the lower plate body 11, i.e., the surface of the hole H, and an outer circumferential surface of the lower plate body 11, and the "]"-shaped cross-section thereof extends in a radial direction of the centerline C.

In the current embodiment, the stopper 12 has a radial direction length capable of covering most of a radial direction distance between the inner and outer circumferential surface of the lower plate body 11.

The stopper 12 is formed by performing pressing to cut and bend the metal sheet filled in an aperture 14 which is a hole formed in the lower plate body 11. Herein, a circumferential direction length of the stopper 12 may be appropriately cut and adjusted as needed.

In the current embodiment, the stopper 12 has a circumferential or radial direction length to support the lower surface of the leading edge 35 as shown in FIG. 4 but not to support a lower surface of a trailing edge 36 to be described below.

In the current embodiment, an upper surface of the stopper 12 is positioned between a lower surface of the upper plate 30 and an upper surface of the middle plate 20 as shown in FIG. 4.

The bearing mount holes 13 are holes through which the bearing mount pins (not shown) of the stationary part S penetrate, and a plurality of bearing mount holes 13 are arranged in a circumferential direction along the edge of the lower plate body 11.

At the edge of the lower plate body 11, a plurality of cooling paths 15*a* formed to cool the bearing are arranged in a circumferential direction. In the current embodiment, the cooling paths 15*a* are provided as rectangular recesses.

As shown in FIG. 2, the middle plate 20 is a circular disc member produced by pressing a metal sheet, is disposed on an upper surface of the lower plate 10, and includes a middle plate body 21, first through holes 22, bearing mount holes 23, and bump foils 24.

The middle plate body 21 is a circular disc portion having the centerline C as the center of circle, and a lower surface thereof is disposed on an upper surface of the lower plate body 11. Herein, the middle plate body 21 has the same diameter as the lower plate body 11.

A hole H having the centerline C as the center of circle is formed at the center of the middle plate body 21. Herein, the hole H of the middle plate body 21 has the same diameter as the hole H of the lower plate body 11.

Each first through hole 22 is a slot-shaped hole extending in the radial direction of the centerline C, and has a length and width through which the stopper 12 may penetrate.

The bearing mount holes 23 are holes through which the bearing mount pins (not shown) of the stationary part S penetrate, and a plurality of bearing mount holes 23 are arranged in a circumferential direction along the edge of the middle plate body 21.

The bearing mount holes 23 of the middle plate 20 are provided at positions corresponding to and have the same shape as the bearing mount holes 13 of the lower plate 10.

Each bump foil 24 is a portion with a trapezoidal planar shape, and has a wave shape in which a plurality of peaks and valleys are alternately connected, so as to be elastically deformable in a vertical direction along the centerline C.

Like the stopper 12, the bump foil 24 is formed by performing pressing to cut and bend the metal sheet filled in an aperture 28 which is a hole formed in the middle plate body 21.

A plurality of bump foils 24 are provided and arranged at preset intervals along the circumferential direction of the centerline C.

Among four sides of the trapezoidal shape of the bump foil 24, only one 25 of two sides 25 and 26 facing and spaced apart from each other along the circumferential direction of the centerline C is coupled to the middle plate body 21, and the other three sides are provided as free ends.

In the current embodiment, only the upstream side 25 of the bump foil 24 on the basis of the flow of air for the bump foil 24 among the two sides facing and spaced apart from each other along the circumferential direction of the centerline C is coupled to the middle plate body 21. That is, in the bump foil 24, only the upstream side 25 is coupled to the middle plate body 21 and the downstream side 26 is provided as a wing capable of free motion.

The bump foil 24 extends downstream along the circumferential direction of the centerline C.

In the current embodiment, the first through hole 22 is provided near the downstream side 26 among the two sides facing and spaced apart from each other along the circumferential direction of the centerline C, and a space between the downstream side 26 of the bump foil 24 and the middle plate body 21 functions as the first through hole 22.

In the current embodiment, the first through hole 22 has a position and shape corresponding to the aperture 14 of the lower plate 10.

In the current embodiment, the bump foil 24 is disposed on a lower surface of a second wing 343 of the upper plate 30 to be described below, and is not disposed on a lower surface of a first wing 342 of the upper plate 30.

In a middle portion of the upstream side 25 of the bump foil 24, a second through hole 27 having a parallelogram shape is formed.

The second through hole 27 is a hole formed to adjust elastic force of the upstream side 25 corresponding to the fixed end of the bump foil 24.

For example, when a radial direction length of the second through hole 27 increases, the elastic force of the upstream side 25 decreases, and when the radial direction length of the second through hole 27 decreases, the elastic force of the upstream side 25 increases.

At the edge of the middle plate body 21, a plurality of cooling paths 15*b* formed to cool the bearing are arranged in a circumferential direction. In the current embodiment, the cooling paths 15*b* have the same size and positions as the cooling paths 15*a*.

The upper plate 30 is a circular disc member produced by pressing a metal sheet, is disposed on the upper surface of the middle plate 20 to face the rotating part R, and includes an upper plate body 31, bearing mount holes 33, top foils 34, leading edges 35, and trailing edges 36.

The lower, middle, and upper plates 10, 20, and 30 may be provided as metal sheets of the same material, and have different thicknesses.

The upper plate body 31 is a circular disc portion having the centerline C as the center of circle, and a lower surface thereof is disposed on an upper surface of the middle plate body 21. Herein, the upper plate body 31 has the same diameter as the lower plate body 11.

A hole H having the centerline C as the center of circle is formed at the center of the upper plate body 31. Herein, the hole H of the upper plate body 31 has the same diameter as the hole H of the lower plate body 11.

The bearing mount holes 33 are holes through which the bearing mount pins (not shown) of the stationary part S penetrate, and a plurality of bearing mount holes 33 are arranged in a circumferential direction along the edge of the upper plate body 31.

The bearing mount holes 33 of the upper plate 30 are provided at positions corresponding to and have the same shape as the bearing mount holes 13 of the lower plate 10 and the bearing mount holes 23 of the middle plate 20.

In the current embodiment, the bearing mount holes 13, 23, and 33 of the lower, middle, and upper plates 10, 20, and 30 are disposed on the same virtual circumference having the centerline C as the center of circle, and may be provided as semicircular recesses as shown in FIG. 2, or circular holes.

Each top foil 34 is a portion with a trapezoidal planar shape, and is disposed on the bump foil 24 to contact the rotating part R.

A plurality of top foils 34 are provided and arranged at preset intervals along the circumferential direction of the centerline C, and disposed at positions corresponding to the bump foils 24.

Like the bump foil 24, the top foil 34 is formed by performing pressing to cut and bend the metal sheet.

In the current embodiment, the top foil 34 includes a top foil body 341, the first wing 342, and the second wing 343.

Figure 7:
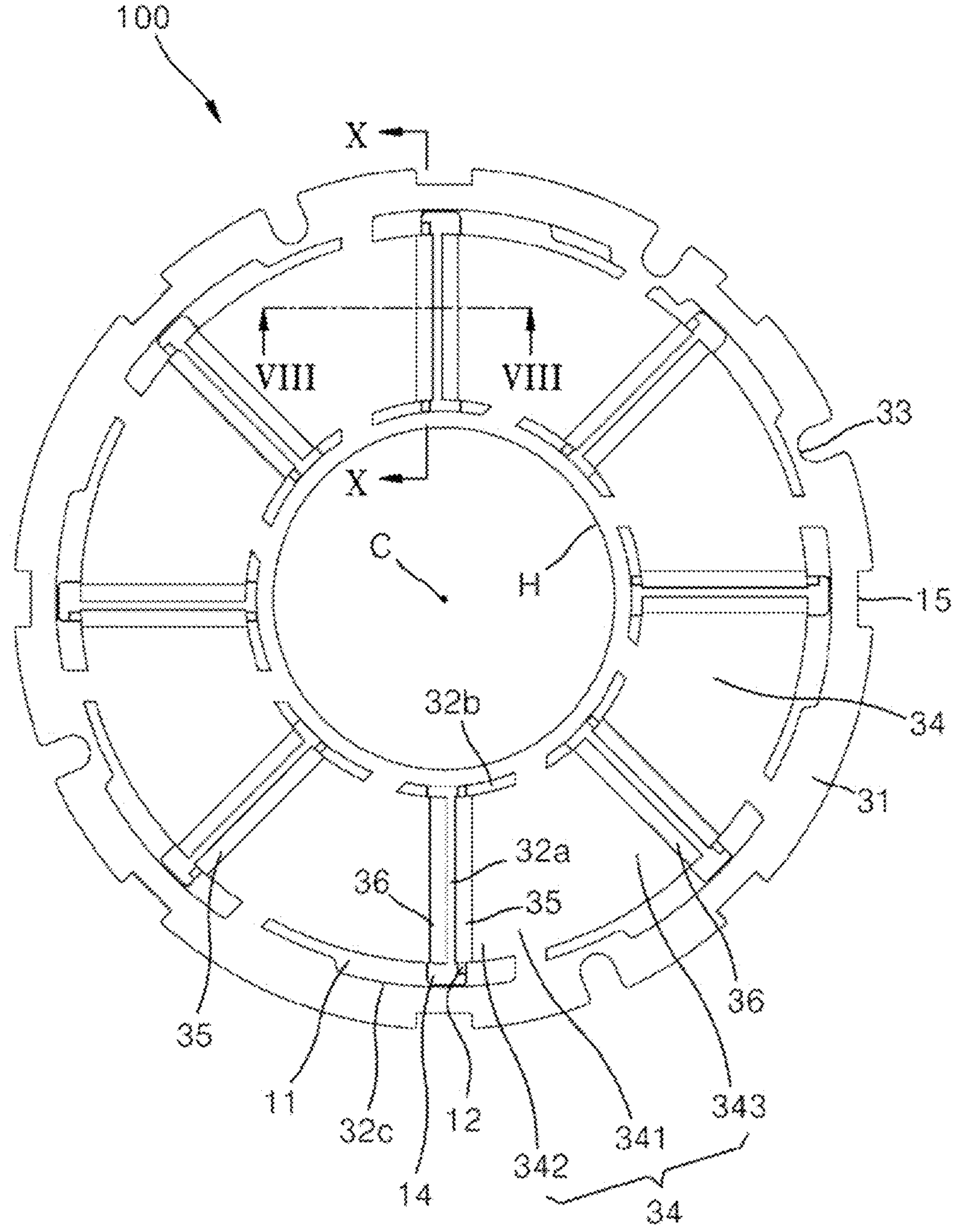
FIG. 7 is a plan view of the thrust foil air bearing illustrated in FIG. 1.

The top foil body 341 is a narrow band region extending along the radial direction of the centerline C as shown in FIG. 7, and inner and outer ends thereof are fixed to the upper plate body 31.

The first wing 342 is a portion protruding forwards, i.e., upstream, from the top foil body 341.

The first wing 342 has a cantilever shape with the top foil body 341 as a fixed end and the opposite side as a free end.

Therefore, the first wing 342 may be elastically deformed in a vertical direction by an air pressure generated by the rotation of the rotating part R.

The second wing 343 is a portion protruding rearwards, i.e., downstream, from the top foil body 341.

Like the first wing 342, the second wing 343 has a cantilever shape with the top foil body 341 as a fixed end and the opposite side as a free end.

Therefore, like the first wing 342, the second wing 343 has a structure which may be elastically deformed in a vertical direction by an air pressure generated by the rotation of the rotating part R.

However, in the current embodiment, because the bump foil 24 is disposed on the lower surface of the second wing 343, unlike the first wing 342, the second wing 343 may not be freely elastically deformed downwards.

In the current embodiment, planar shapes of the first and second wings 342 and 343 are determined based on the cooperation of a middle through hole 32*a*, an inner through hole 32*b*, and an outer through hole 32*c*.

The inner through hole 32*b* is an arc-shaped hole extending along the circumferential direction of the centerline C, and is provided at an inner side of the top foil 34, and a plurality of inner through holes 32*b* are arranged along the circumferential direction of the centerline C.

The outer through hole 32*c* is an arc-shaped hole extending along the circumferential direction of the centerline C, and is provided at an outer side of the top foil 34, and a plurality of outer through holes 32*c* are arranged along the circumferential direction of the centerline C.

The middle through hole 32*a* is a slot-shaped linear hole extending along the radial direction of the centerline C to connect the inner and outer through holes 32*b* and 32*c* to each other.

The middle through hole 32*a* is provided at a position corresponding to the first through hole 22 of the middle plate 20 and the aperture 14 of the lower plate 10.

That is, in the current embodiment, a plurality of "I"-shaped through holes each formed by the middle, inner, and outer through holes 32*a*, 32*b*, and 32*c* are arranged along the circumferential direction of the centerline C, and thus a plurality of top foils 34 each including the first and second wings 342 and 343 are formed.

The leading edge 35 is provided at a front end of the first wing 342 as shown in FIG. 3, and is similar to a leading edge of an airfoil.

In the current embodiment, the leading edge 35 has a shape bent downwards at a first curvature R1 preset as shown in FIG. 4. Herein, the center of curvature of the leading edge 35 is present below the upper plate 30.

Figure 8:
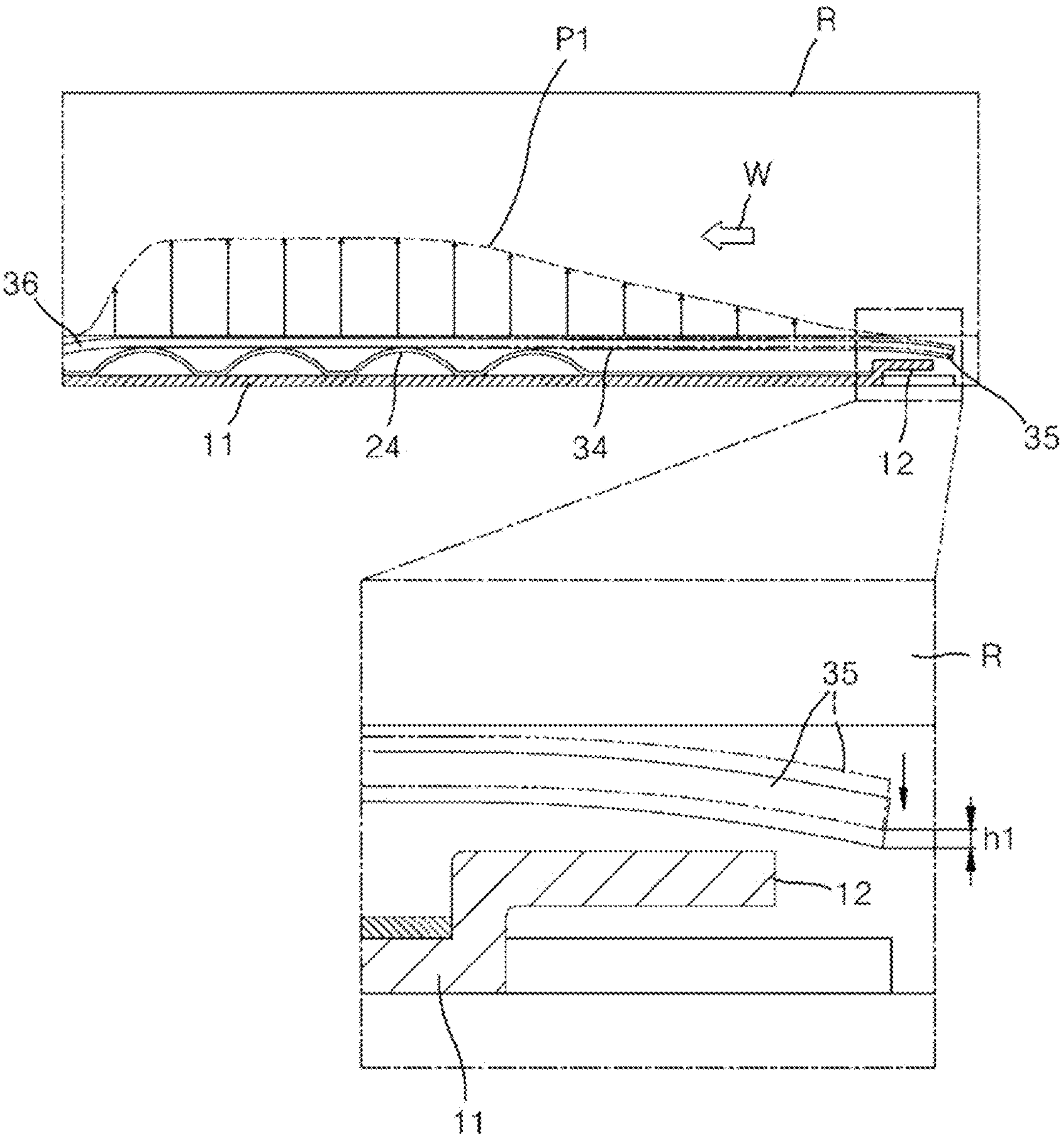
FIG. 8 is a cross-sectional view taken along line VIII-VIII of the thrust foil air bearing illustrated in FIG. 7 at low-speed operation.

Therefore, as shown in FIG. 8, when the rotating part R rotates along the rotation direction W, an air pressure P1 is generated on an upper surface of the top foil 34 by the rotation, the first wing 342 is elastically deformed downwards by the air pressure P1, and thus the leading edge 35 sags downwards by a preset height h1 toward the lower plate 10. In this case, the stopper 12 and the lower surface of the leading edge 35 do not contact each other.

Figure 9:
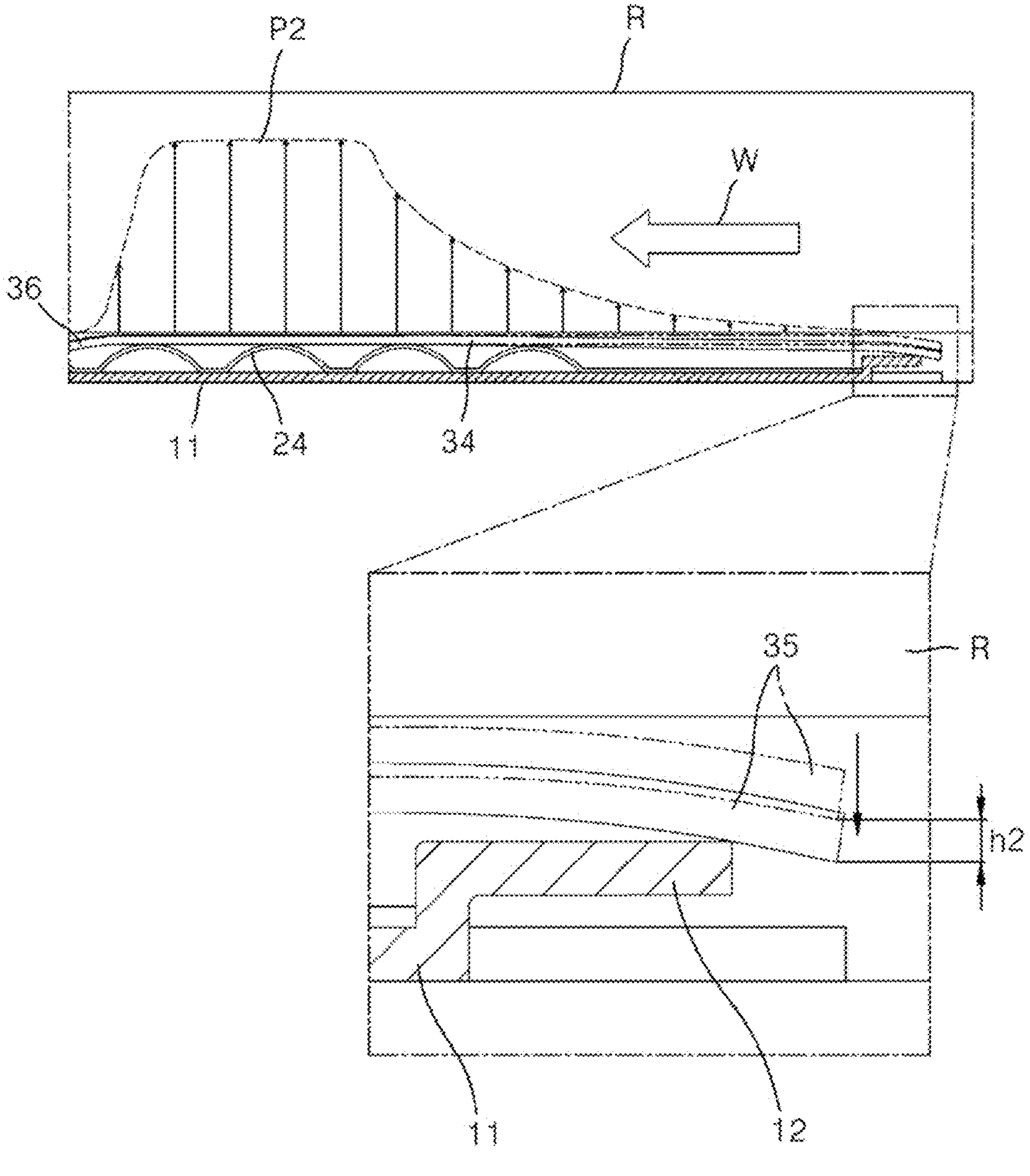
FIG. 9 is a cross-sectional view taken along line VIII-VIII of the thrust foil air bearing illustrated in FIG. 7 at high-speed operation.

When the rotating part R rotates at a high speed above a preset value, an air pressure P2 generated on the upper surface of the top foil 34 also increases and thus the leading edge 35 sags downwards by a deeper height h2 toward the lower plate 10 as shown in FIG. 9. In this case, the stopper 12 supports the lower surface of the leading edge 35 to restrict the leading edge 35 from moving downwards by more than a preset height.

The trailing edge 36 is provided at a rear end of the second wing 343 as shown in FIG. 3, and is similar to a trailing edge of an airfoil.

In the current embodiment, the trailing edge 36 has a shape bent downwards at a second curvature R2 preset as shown in FIG. 4. Herein, the center of curvature of the trailing edge 36 is present below the upper plate 30.

However, in the current embodiment, because the bump foil 24 restrains the lower surface of the second wing 343, even when the rotating part R rotates at a relatively high speed, downward movement of the trailing edge 36 is almost zero.

At the edge of the upper plate body 31, a plurality of cooling paths 15*c* formed to cool the bearing are arranged in a circumferential direction. In the current embodiment, the cooling paths 15*c* have the same size and positions as the cooling paths 15*a* and 15*b*.

In the current embodiment, the cooling paths 15*a*, 15*b*, and 15*c* of the lower, middle, and upper plates 10, 20, and 30 cooperate to form cooling paths 15 of the thrust foil air bearing 100 as shown in FIG. 1.

An example of the operating principle of the thrust foil air bearing 100 with the above-described configuration will now be described.

As shown in FIG. 8, when the rotating part R rotates at a relatively low speed, a relatively low air pressure P1 is generated on the upper surface of the top foil 34 by the rotation of the rotating part R, the first wing 342 is elastically deformed downwards to a relatively small depth by the air pressure P1, and thus the leading edge 35 sags downwards slightly by the preset height h1. In this case, the stopper 12 and the lower surface of the leading edge 35 do not contact each other, and the elastic force of the first wing 342 and the air pressure P1 are balanced.

Figure 10:
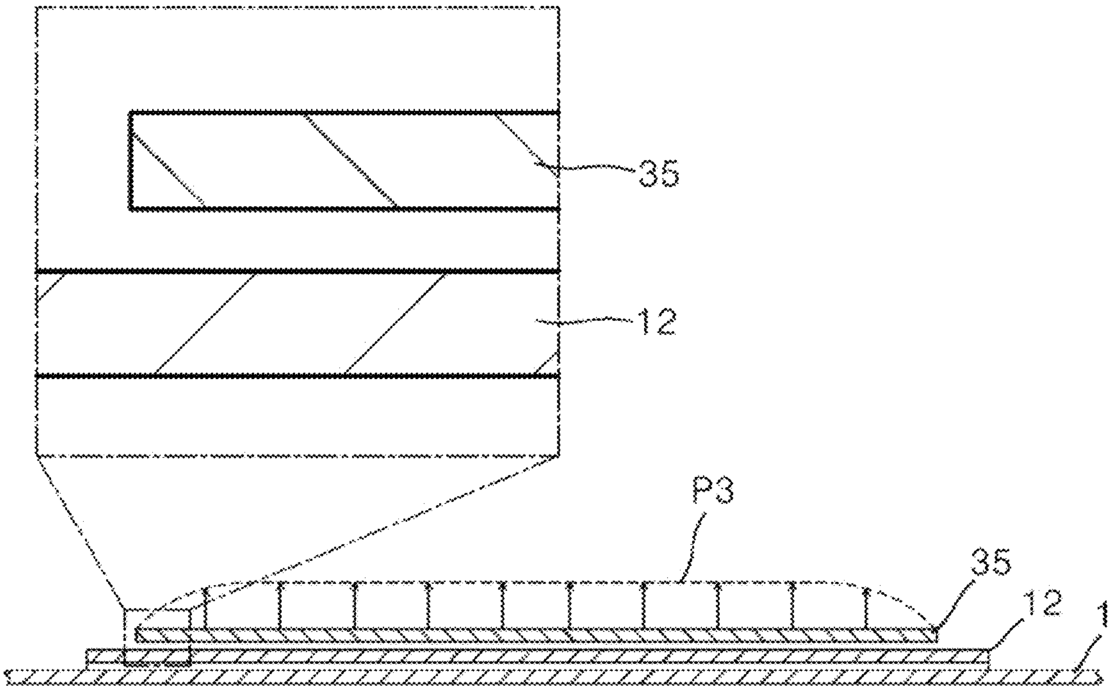
FIG. 10 is a cross-sectional view taken along line X-X of the thrust foil air bearing illustrated in FIG. 7 at low-speed operation.

In addition, when the rotating part R rotates at a relatively low speed, a relatively low air pressure P1 is generated on the upper surface of the top foil 34, and an air pressure P3 generated on an upper surface of the leading edge 35 has a relatively uniform and low value as shown in FIG. 10.

However, as shown in FIG. 9, when the rotating part R rotates at a relatively high speed, a relatively high air pressure P2 is generated on the upper surface of the top foil 34 by the rotation of the rotating part R, the first wing 342 is elastically deformed downwards to a relatively large depth by the air pressure P1, and thus the leading edge 35 sags downwards by a relatively deep height h2. In this case, the stopper 12 supports the lower surface of the leading edge 35 to restrict the leading edge 35 from moving downwards any further.

Figure 11:
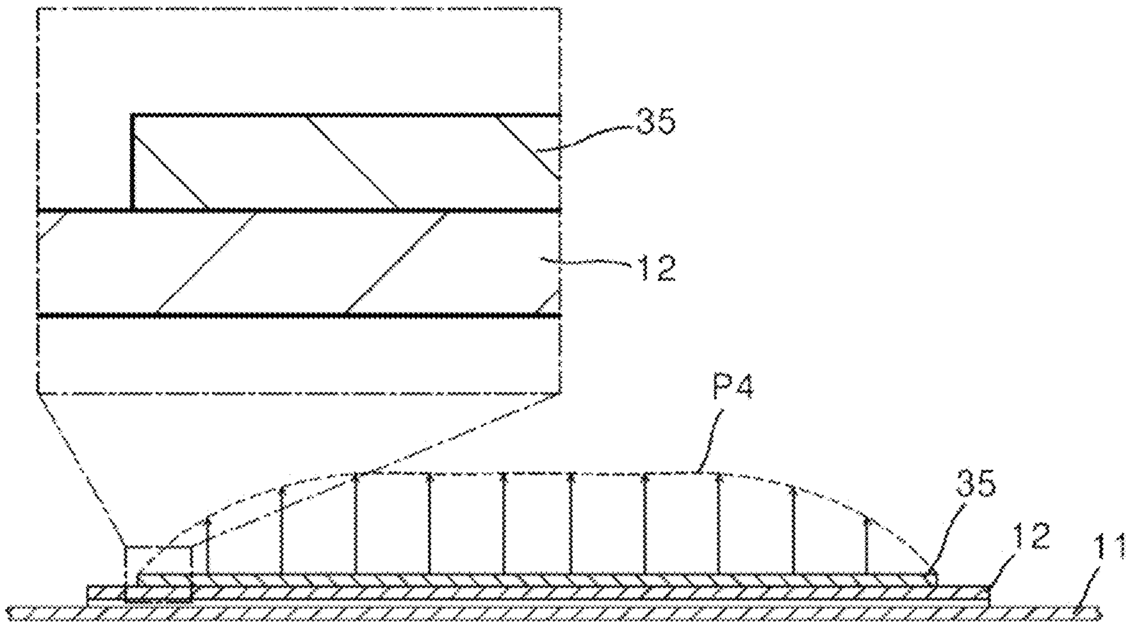
FIG. 11 is a cross-sectional view taken along line X-X of the thrust foil air bearing illustrated in FIG. 7 at high-speed operation.

In addition, when the rotating part R rotates at a relatively high speed, a relatively high air pressure P2 is generated on the upper surface of the top foil 34, and an air pressure P4 generated on the upper surface of the leading edge 35 has a relatively uniform and high value as shown in FIG. 11.

Meanwhile, because the bump foil 24 firmly restrains the entirety of the lower surface of the second wing 343, the trailing edge 36 hardly sags downwards regardless of the rotation speed of the rotating part R.

The thrust foil air bearing 100 with the above-described configuration is a thrust foil air bearing usable in apparatuses including the stationary part S, and the rotating part R which rotates relative to the stationary part S about the centerline C, the thrust foil air bearing including the lower plate 10 coupled to the stationary part S so as not to move relatively; the middle plate 20 disposed on the upper surface of the lower plate 10 and including the bump foil 24 capable of elastic deformation; and the upper plate 30 disposed on the upper surface of the middle plate 20 to face the rotating part R and including the top foil 34 disposed on the bump foil 24 to contact the rotating part R, and the top foil 34 includes the leading edge 35 disposed upstream on the basis of the flow of air and provided to move downwards toward the lower plate 10 by an air pressure generated by the rotation of the rotating part R. As such, the thrust foil air bearing 100 may carry a higher load by increasing the air pressure P1 or P2 generated on the upper surface of the top foil 34 when the rotating part R rotates.

In the thrust foil air bearing 100, the top foil 34 includes the top foil body 341; and the first wing 342 protruding upstream from the top foil body 341 and having a cantilever shape capable of elastic deformation in a vertical direction, and the leading edge 35 is provided at a front end of the first wing 342. As such, elastic sagging of the leading edge 35 may be simply implemented, and an elastic modulus of the first wing 342 may be easily controlled in consideration of a rotation speed of the rotating part R.

In the thrust foil air bearing 100, the shape of the first wing 342 is determined based on the cooperation of the inner through hole 32*b* extending along the circumferential direction of the centerline C and provided at an inner side of the top foil 34; the outer through hole 32*c* extending along the circumferential direction of the centerline C and provided at an outer side of the top foil 34; and the middle through hole 32*a* extending along the radial direction of the centerline C to connect the inner and outer through holes 32*b* and 32*c*. As such, the first wing 342 may be simply formed through pressing.

In the thrust foil air bearing 100, the leading edge 35 has a shape bent downwards at the first curvature R1 preset. As such, compared to the leading edge 35 with no curvature, the generation of the air pressure P1 or P2 on the upper surface of the top foil 34 may be accelerated.

In the thrust foil air bearing 100, the lower plate 10 includes the stopper 12 for restraining the leading edge 35 to limit downward elastic deformation of the leading edge 35 to a preset depth. As such, the air pressure P1 or P2 may be efficiently formed by preventing excessive sagging of the leading edge 35, and noise and abrasion caused by the collision between the leading edge 35 and other elements may be prevented.

In the thrust foil air bearing 100, the stopper 12 is disposed below the leading edge 35 while penetrating through the middle plate 20, to support the lower surface of the leading edge 35. As such, the stopper 12 may be simply formed through pressing.

In the thrust foil air bearing 100, the stopper 12 extends in the radial direction of the centerline C and has a cross-section bent in a "]" shape. As such, by increasing a contact area between the lower surface of the leading edge 35 and the stopper 12, the lower surface of the leading edge 35 may be prevented from being damaged.

In the thrust foil air bearing 100, the top foil 34 further includes the trailing edge 36 disposed downstream on the basis of the flow of air and having a shape bent downwards at the second curvature R2 preset. As such, the air flowing on the upper surface of the top foil 34 may be gently separated from the trailing edge 36 of the top foil 34, and thus the formation of an air vortex may be prevented. This vortex may exert an adverse aerodynamic effect in subsequent relationship with the top foil 34.

In the thrust foil air bearing 100, the lower, middle, and upper plates 10, 20, and 30 include the bearing mount holes 13, 23, and 33 through which the bearing mount pins (not shown) penetrate. As such, using the bearing mount pins (not shown) which are relatively easy to procure and have a high structural strength, the lower, middle, and upper plates 10, 20, and 30 may be sequentially stacked so as to be simply mounted on the stationary part S.

Figure 12:
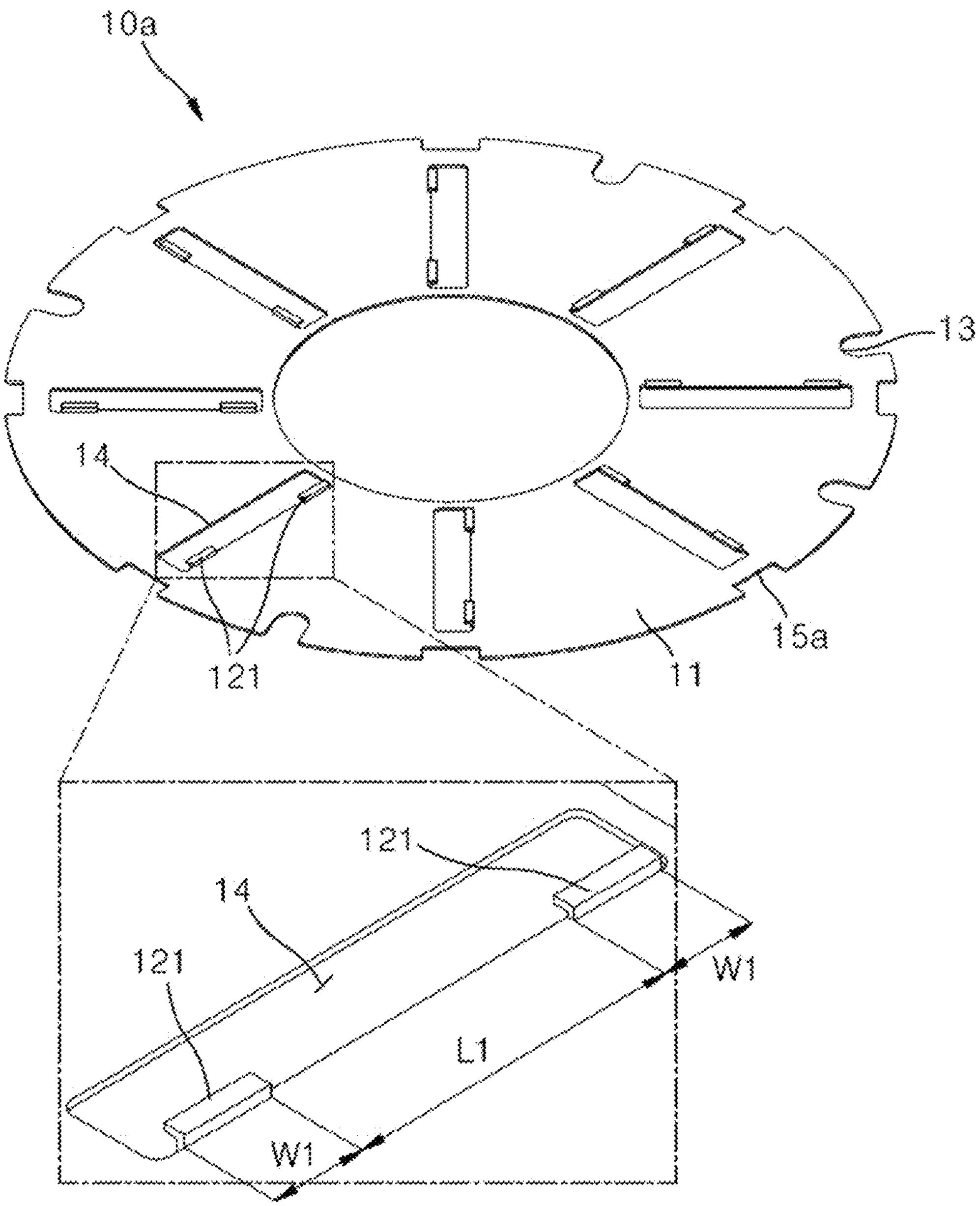
FIG. 12 is a perspective view of the lower plate illustrated in FIG. 2, according to another embodiment of the present invention.

Meanwhile, FIG. 12 shows a lower plate 10*a* modified from the lower plate 10. The lower plate 10*a* differs from the lower plate 10 in that each long stopper 12 is divided into a plurality of unit stoppers 121 spaced apart from each other in the radial direction of the centerline C.

A width W1 of and a distance L1 between the unit stoppers 121 are appropriately determined in consideration of the thickness and elasticity of the top foil 34.

Figure 13:
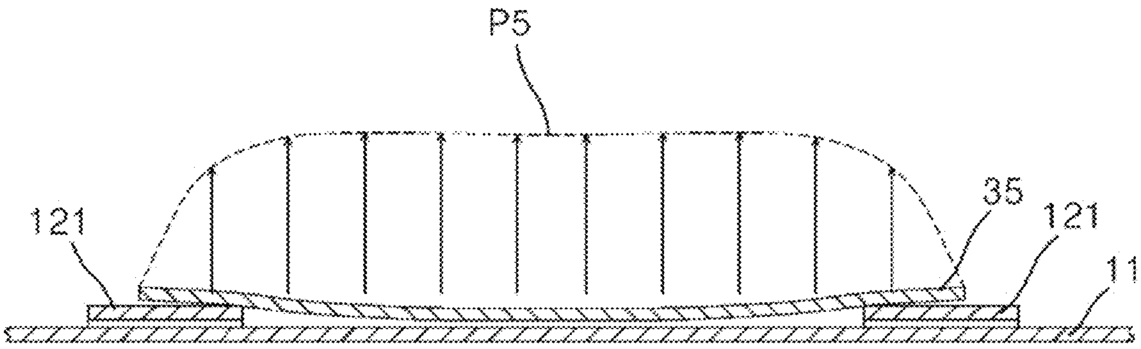
FIG. 13 is a cross-sectional view taken along line X-X of the thrust foil air bearing including the lower plate illustrated in FIG. 12.

Using the above-described lower plate 10*a*, on the assumption that the rotation speed of the rotating part R is the same, an air pressure P5 generated on the upper surface of the leading edge 35 as shown in FIG. 13 may have a higher value than the air pressure P4 shown in FIG. 11 because, unlike the case in which the stopper 12 is used, a middle portion of the leading edge 35 may sag slightly more than both ends of the leading edge 35 as shown in FIG. 13.

Although one upper plate 30, one lower plate 10, and one middle plate 20 are mounted in the afore-described embodiments, at least one of the upper, lower, and middle plates 30, 10, and 20 may include two or more plates.

Although the leading and trailing edges 35 and 36 each have one center of curvature in the afore-described embodiments, the leading and trailing edges 35 and 36 may each have a plurality of centers of curvature to form a complex-shaped curved surface.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A thrust foil air bearing usable in apparatuses comprising a stationary part, and a rotating part which rotates relative to the stationary part about a centerline, the thrust foil air bearing comprising:

a lower plate coupled to the stationary part so as not to move relatively;

a middle plate disposed on an upper surface of the lower plate and comprising a bump foil capable of elastic deformation; and an upper plate disposed on an upper surface of the middle plate to face the rotating part and comprising a top foil disposed on the bump foil to contact the rotating part, wherein the top foil comprises a leading edge disposed upstream on a basis of flow of air and provided to move downwards toward the lower plate by an air pressure generated by the rotation of the rotating part, wherein the top foil further comprises:

a top foil body; and a first wing protruding upstream from the top foil body, the first wing being cantilevered with respect to the top foil body such that a rear end of the first wing is fixedly supported by the top foil body and a front end of the first wing is a free end, and the first wing being capable of elastic deformation in a vertical direction, and wherein the leading edge is provided at the front free end of the first wing.

2. The thrust foil air bearing of claim 1, wherein a shape of the first wing is determined based on cooperation of:

an inner through hole extending along a circumferential direction of the centerline and provided at an inner side of the top foil;

an outer through hole extending along the circumferential direction of the centerline and provided at an outer side of the top foil; and a middle through hole extending along a radial direction of the centerline to connect the inner and outer through holes.

3. The thrust foil air bearing of claim 1, wherein the leading edge has a shape bent downwards at a first curvature preset.

4. The thrust foil air bearing of claim 1, wherein the lower plate comprises a stopper for restricting the leading edge to limit downward elastic deformation of the leading edge to a preset depth.

5. The thrust foil air bearing of claim 4, wherein the stopper is disposed below the leading edge while penetrating through the middle plate, to support a lower surface of the leading edge.

6. The thrust foil air bearing of claim 4, wherein the stopper extends in a radial direction of the centerline and comprises a first leg that extends axially from the lower plate and a second leg that extends circumferentially from an end of the first leg opposite from an end of the first leg that is secured to the lower plate.

7. The thrust foil air bearing of claim 4, wherein the stopper comprises a plurality of unit stoppers spaced apart from each other in a radial direction of the centerline.

8. The thrust foil air bearing of claim 3, wherein the top foil further comprises a trailing edge disposed downstream on a basis of flow of air and having a shape bent downwards at a second curvature preset.

9. The thrust foil air bearing of claim 1, wherein the lower, middle, and upper plates comprise bearing mount holes through which bearing mount pins penetrate.

* * * * *